(12) United States Patent
Zarom

(10) Patent No.: US 12,542,794 B2
(45) Date of Patent: Feb. 3, 2026

(54) SYSTEM AND METHOD FOR IDENTIFYING CYBER-ATTACKS ON A COMPUTING DEVICE OF A PROTECTED NETWORK

(71) Applicant: CYBOWALL LTD., Haifa (IL)

(72) Inventor: Rony Zarom, Ra'anana (IL)

(73) Assignee: CYBOWALL LTD., Haifa (IL)

( * ) Notice: Subject to any disclaimer, the term of this patent is extended or adjusted under 35 U.S.C. 154(b) by 132 days.

(21) Appl. No.: 18/286,125

(22) PCT Filed: Apr. 7, 2022

(86) PCT No.: PCT/IL2022/050364
§ 371 (c)(1),
(2) Date: Oct. 8, 2023

(87) PCT Pub. No.: WO2022/215077
PCT Pub. Date: Oct. 13, 2022

(65) Prior Publication Data
US 2024/0205250 A1    Jun. 20, 2024

Related U.S. Application Data

(60) Provisional application No. 63/172,265, filed on Apr. 8, 2021.

(51) Int. Cl.
*H04L 9/40* (2022.01)
*G06F 21/55* (2013.01)
*G06F 21/57* (2013.01)

(52) U.S. Cl.
CPC ........ *H04L 63/1425* (2013.01); *G06F 21/552* (2013.01); *G06F 21/554* (2013.01);
(Continued)

(58) Field of Classification Search
CPC ............. H04L 63/1425; H04L 63/1416; H04L 63/1433; H04L 63/145; G06F 21/552; G06F 21/554; G06F 21/577
See application file for complete search history.

(56) References Cited

U.S. PATENT DOCUMENTS 10,574,683 B1 * 2/2020 Ghosh ................. H04L 63/1425
10,601,848 B1   3/2020 Jeyaraman et al.
(Continued)

FOREIGN PATENT DOCUMENTS

EP    3343868 A1    7/2018

OTHER PUBLICATIONS

PCT International Search Report and Written Opinion for International Application No. PCT/IL2022/050364, mailed Jul. 25, 2022, 7pp.

*Primary Examiner* — Shirley X Zhang
(74) *Attorney, Agent, or Firm* — The Roy Gross Law Firm, LLC; Roy D. Gross

(57) ABSTRACT

A method and system for identifying cyber-attacks on a computing device of a protected computer network, by at least one processor may include: monitoring network traffic via a gateway of the protected network; extracting one or more indicators of compromise (IOCs) from the monitored network traffic; classifying the extracted IOCs to produce one or more generalized IOC (GIOC) data elements; chronologically aggregating the one or more GIOC data elements, to produce at least one sequence data structure; and analyzing the at least one sequence data structure, based on a rule-base data structure, to identify an indication of attack (IOA) on a computing device of the protected computer network.

19 Claims, 11 Drawing Sheets

(52) U.S. Cl.
CPC ........ *G06F 21/577* (2013.01); *H04L 63/1416* (2013.01); *H04L 63/1433* (2013.01); *H04L 63/145* (2013.01)

(56) References Cited

U.S. PATENT DOCUMENTS

| | | | |
|---|---|---|---|
| 10,630,704 B1* | 4/2020 | Ghosh | H04L 63/1416 |
| 11,323,465 B2* | 5/2022 | Cheng | G06N 20/10 |
| 2014/0067734 A1* | 3/2014 | Hawkins | G06N 7/01 |
| | | | 706/58 |
| 2018/0004948 A1 | 1/2018 | Martin et al. | |
| 2018/0219888 A1* | 8/2018 | Apostolopoulos | H04L 63/1425 |
| 2019/0182274 A1* | 6/2019 | Doron | G06N 3/044 |
| 2019/0349392 A1* | 11/2019 | Wetterwald | H04L 43/0852 |
| 2019/0372999 A1 | 12/2019 | Young et al. | |
| 2020/0213338 A1 | 7/2020 | Lotem et al. | |
| 2021/0248443 A1* | 8/2021 | Shu | H04L 63/1416 |

\* cited by examiner

184 GIOCS – TRILLIONS OF IOC COMBINATIONS

| Reconnaissance | Resource Development | Initial Access | Execution | Persistence |
|---|---|---|---|---|
| Active Scanning | Acquire Infrastructure | Drive-by Compromise | Command and Scripting Interpreter | Account Manipulation |
| Gather Victim Host Info. | Compromise Accounts | Exploit Public-Facing Application | Exploitation for Client Execution | BITS Jobs |
| Gather Victim Identity Info. | Compromise Infrastructure | External Remote Services | Inter-Process Communication | Boot or Logon Autostart Execution |
| Gather Victim Network Info. | Develop Capabilities | Hardware Additions | Native API | Boot or Logon Initialization Scripts |
| Gather Victim Org. Info. | Establish Accounts | Phishing | Scheduled Task/Job | Browser Extensions |
| Phishing for Information | Obtain Capabilities | Replication Through Removable Media | Shared Modules | Compromise Client Software Binary |
| Search Closed Sources | | Supply Chain Compromise | Software Deployment Tools | Create Account |
| Search Open Tech. Database | | Trusted Relationship | System Services | Create or Modify System Process |
| Search Open Websites/Domains | | Valid Accounts | User Execution | Event Triggered Execution |
| Search Victim-Owned Websites | | | Windows Management Instrumentation | External Remote Services |
| | | | | Hijack Execution Flow |
| | | | | Implant Container Image |
| | | | | Office Application Startup |
| | | | | Pre-OS Boot |
| | | | | Scheduled Task/Job |
| | | | | Server Software Component |
| | | | | Traffic Signaling |
| | | | | Valid Accounts |

FIG. 3

184 GIOCS – TRILLIONS OF IOC COMBINATIONS

| Privilege Escalation | Defense Evasion (1) | Defense Evasion (2) | Credential Access | Discovery (1) |
|---|---|---|---|---|
| Abuse Elevation Control Mechanism | Abuse Elevation Control Mechanism | Network Boundary Bridging | Brute Force | Account Discovery |
| Access Token Manipulation | Access Token Manipulation | Obfuscated Files or Information | Credentials from Password Stores | Application Window Discovery |
| Boot or Logon Autostart Execution | BITS Jobs | Pre-OS Boot | Exploitation for Credential Access | Browser Bookmark Discovery |
| Boot or Logon Initialization Scripts | Deobfuscate/Decode Files or Info. | Process Injection | Forced Authentication | Cloud Infrastructure Discovery |
| Create or Modify System Process | Direct Volume Access | Rogue Domain Controller | Forge Web Credentials | Cloud Service Dashboard |
| Domain Policy Modification | Domain Policy Modification | Rootkit | Input Capture | Cloud Service Discovery |
| Event Triggered Execution | Execution Guardrails | Signed Binary Proxy Execution | Man-in-the-Middle | Domain Trust Discovery |
| Exploitation for Privilege Escalation | Exploitation for Defense Evasion | Signed Script Proxy Execution | Modify Authentication Process | File and Directory Discovery |
| Hijack Execution Flow | Files/Directory Permissions Mod. | Subvert Trust Controls | Network Sniffing | Network Service Scanning |
| Process Injection | Hide Artifacts | Template Injection | OS Credential Dumping | Network Share Discovery |
| Scheduled Task/Job | Hijack Execution Flow | Traffic Signaling | Steal Application Access Token | Network Sniffing |
| Valid Accounts | Impair Defenses | Trusted Dev. Utilities Proxy Exec. | Steal or Forge Kerberos Tickets | Password Policy Discovery |
| | Indicator Removal on Host | Unused/Unsupported Cloud Regions | Steal Web Session Cookie | Peripheral Device Discovery |
| | Indirect Command Execution | Use Alt. Authentication Material | Two-Factor Authentication Interception | Permission Groups Discovery |
| | Masquerading | Valid Accounts | Unsecured Credentials | Process Discovery |
| | Modify Authentication Process | Virtualization/Sandbox Evasion | | |
| | Modify Cloud Compute Infrastructure | Weaken Encryption | | |
| | Modify Registry | XSL Script Processing | | |
| | Modify System Image | | | |

FIG. 3 (continued)

184 GIOCS – TRILLIONS OF IOC COMBINATIONS

| Discovery (2) | Lateral Movement | Collection | Command and Control | Exfiltration | Impact |
|---|---|---|---|---|---|
| Query Registry | Exploitation of Remote Services | Archive Collected Data | Application Layer Protocol | Automated Exfiltration | Account Access Removal |
| Remote System Discovery | Internal Spear Phishing | Audio Capture | Communication Through Removable Media | Data Transfer Size Limits | Data Destruction |
| Software Discovery | Lateral Tool Transfer | Automated Collection | Data Encoding | Exfiltration Over Alternative Protocol | Data Encrypted for Impact |
| System Information Discovery | Remote Service Session Hijacking | Clipboard Data | Data Obfuscation | Exfiltration Over C2 Channel | Data Manipulation |
| System Network Configuration Discovery | Remote Services | Data from Cloud Storage Object | Dynamic Resolution | Exfiltration Over Other Network Medium | Defacement |
| System Network Connection Discovery | Replication Through Removable Media | Data from Configuration Repository | Encrypted Channel | Exfiltration Over Physical Medium | Disk Wipe |
| System Owner/User Discovery | Software Deployment Tools | Data from Information Repositories | Fallback Channels | Exfiltration Over Web Services | Endpoint Denial of Service |
| System Service Discovery | Taint Shared Content | Data from Local System | Ingress Tool Transfer | Scheduled Transfer | Firmware Corruption |
| System Time Discovery | Use Alternate Authentication Material | Data from Network Shared Drive | Multi-Stage Channels | Transfer Data to Cloud Account | Inhibit System Recovery |
| Virtualization/Sandbox Evasion | | Data from Removable Media | Non-Application Layer Protocol | | Network Denial of Service |
| | | Data Staged | Non-Standard Port | | Resource Hijacking |
| | | Email Collection | Protocol Tunneling | | Service Stop |
| | | Input Capture | Proxy | | System Shutdown/Reboot |
| | | Man in the Browser | Remote Access Software | | |
| | | Man-in-the-Middle | Traffic Signaling | | |
| | | Screen Capture | Web Services | | |
| | | Video Capture | | | |

FIG. 3 (continued)

|  | Timeframe | Seq. ID 1 | Seq. ID 2 | Seq. ID 3 | Seq. ID 4 |
|---|---|---|---|---|---|
| Server 1 | B | 1 | 1 | 0 | 1 |
|  | A | 0 | 1 | 1 | 1 |
| Server 2 | B | 1 | 1 | 0 | 1 |
|  | A | 0 | 1 | 1 | 1 |
| Server 3 | B | 1 | 1 | 0 | 1 |
|  | A | 0 | 0 | 1 | 1 |
| Server 4 | B | 1 | 1 | 0 | 1 |
|  | A | 0 | 1 | 1 | 1 |
| P |  | 1 | 0.25 | -1 | 0 |

A = time period (e.g., one month), including attack.

B = time period (e.g., one month), preceding A.

J = Number of servers.

P(n) = Likelihood indicator that a Sequence is an IOA. For example:

$$P(n) = \frac{1}{J} \sum_{n=1}^{J} A_n - B_n$$

FIG. 8

SYSTEM AND METHOD FOR IDENTIFYING CYBER-ATTACKS ON A COMPUTING DEVICE OF A PROTECTED NETWORK

CROSS REFERENCE TO RELATED APPLICATIONS

This application is a National Phase Application of PCT International Application No. PCT/IL2022/050364, having International Filing Date of Apr. 7, 2022, claiming the benefit of priority under 35 U.S.C. § 119 (e) of U.S. Provisional Patent Application No. 63/172,265, filed Apr. 8, 2021. The contents of the above applications are incorporated by reference as if fully set forth herein in their entirety.

FIELD OF THE INVENTION

The present invention relates generally to systems and methods of cyber-security. More specifically, the present invention relates to identifying cyber-attacks on a computing device of a protected computer network.

BACKGROUND OF THE INVENTION

Currently available methods and systems may be ineffective, or inaccurate in producing alerts, and/or thwarting cyber-attacks aimed at protected computer networks.

SUMMARY OF THE INVENTION

Embodiments of the invention may employ abstraction of incoming indicators of compromise (IOCs), to facilitate identification of suspicious sequences of network traffic data elements through machine-learning based technology.

Embodiments of the invention may include a method of identifying, by at least one processor, cyber-attacks on a computing device of a protected computer network.

Embodiments of the method may include monitoring network traffic via a gateway of the protected network; extracting one or more indicators of compromise (IOCs) from the monitored network traffic; classifying the extracted IOCs to produce one or more generalized IOC (GIOC) data elements; chronologically aggregating the one or more GIOC data elements, to produce at least one sequence data structure; and analyzing the at least one sequence data structure, based on a rule-base data structure, to identify an indication of attack (IOA) on a computing device of the protected computer network.

Embodiments of the invention may produce at least one alert or notification, indicating a likelihood that one or more specific sequence data structures may be associated with an IOA against a computing device of the protected network.

According to some embodiments, the at least one sequence data structure may include a chronologic aggregation of one or more GIOC data elements that pertain to one or more specific network entities of the protected network, and wherein the at least one sequence data structure corresponds to a time window of a predefined length.

Embodiments of the invention may include introducing at least one sequence data structure as input to a machine learning (ML) based classification model, trained to predict a likelihood of the at least one sequence data structure to be associated with a cyber-attack; determining at least one rule, associating the at least one sequence data structure to an IOA, based on the predicted likelihood; and aggregating the at least one determined rule to obtain the rule-base data structure.

Embodiments of the invention may include chronologically aggregating a first plurality of sequence data structures corresponding to a first timeslot; obtaining at least one annotation data element, indicating a cyber-attack that has suspectedly occurred during the first timeslot; and
training the classification model to predict a likelihood of at least one sequence data structure to be associated with an IOA, based on the sequence data structures of the first timeslot, and the at least one annotation data element.

Embodiments of the invention may include chronologically aggregating a second plurality of sequence data structures corresponding to a second timeslot; and training the classification model to predict a likelihood of at least one sequence data structure to be associated with an IOA, further based on the sequence data structures of the second timeslot.

According to some embodiments, the first timeslot may correspond to a period that includes the suspected cyber-attack, and the second timeslot may correspond to a period that predates the suspected cyber-attack.

According to some embodiments, the ML-based classification model may include a random forest decision tree model, where each node of the random forest decision tree model represents a sequence data structure.

According to some embodiments, the at least one rule may include two or more sequence data structures, associated by a Boolean logic function. Additionally, or alternatively, the two or more sequence data structures may be associated by at least one attribute of order, indicating an order of appearance of the two or more sequence data structures in the monitored network traffic.

Additionally, or alternatively, embodiments of the invention may scan one or more entities of the protected computer network, to obtain one or more organizational vulnerabilities, and produce a simulated sequence of IOCs that simulate traversal of an attack vector, based on the organizational vulnerabilities. Embodiments of the invention may generalize the IOCs of the simulated sequence, so as to produce a simulated sequence of GIOC, and produce at least one rule, based on the simulated sequence of GIOCs, where said rule may be associated with a definition of one or more mitigation actions. Embodiments of the invention may subsequently analyze the at least one sequence data structure in relation to the at least one rule. Based on this analysis, embodiments of the invention may perform the one or more mitigation actions associated with the at least one rule.

Additionally, or alternatively, embodiments of the invention may calculate a likelihood value of at least one simulated GIOC sequence, representing a likelihood of the relevant simulated GIOC sequence to be included in a cyber-attack, and produce the at least one rule further based on the likelihood value.

Embodiments of the invention may include system for identifying cyber-attacks on a computing device of a protected network.

Embodiments of the system may include a non-transitory memory device, wherein modules of instruction code may be stored, and at least one processor associated with the memory device, and configured to execute the modules of instruction code. Upon execution of said modules of instruction code, the at least one processor may be configured to monitor network traffic via a gateway of the protected network; extract one or more IOCs from the monitored network traffic; classify the extracted IOCs to produce one or more GIOC data elements; chronologically aggregate the one or more GIOC data elements, to produce at least one sequence data structure; and analyze the at least one sequence data structure, based on a rule-base data structure, to identify an IOA on a computing device of the protected computer network.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 3 is a schematic diagram, depicting generalization, or classification of indicators of compromise (IOCs) to form generalized indicators of compromise (GIOCs), according to some embodiments;

FIG. 8 is a table, representing an example of annotated data regarding pertinence of one or more sequence data structures to a suspected cyber-attack, according to some embodiments.

Figure 1:
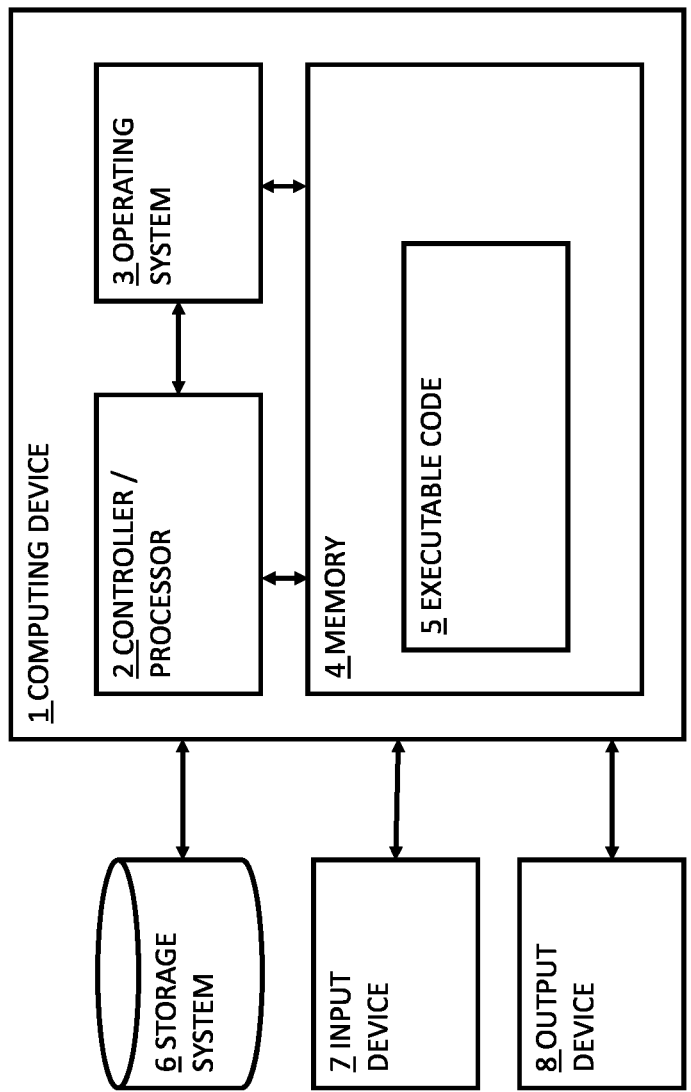
FIG. 1 is a block diagram, depicting a computing device which may be included in a system for identifying cyber-attacks on a computing device of a protected computer network according to some embodiments.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term "set" when used herein may include one or more items.

Unless explicitly stated, the method embodiments described herein are not constrained to a particular order or sequence. Additionally, some of the described method embodiments or elements thereof can occur or be performed simultaneously, at the same point in time, or concurrently.

Reference is now made to FIG. 1, which is a block diagram depicting a computing device, which may be included within an embodiment of a system for identifying cyber-attacks on a computing device of a protected computer network, according to some embodiments.

Computing device 1 may include a processor or controller 2 that may be, for example, a central processing unit (CPU) processor, a chip or any suitable computing or computational device, an operating system 3, a memory 4, executable code 5, a storage system 6, input devices 7 and output devices 8. Processor 2 (or one or more controllers or processors, possibly across multiple units or devices) may be configured to carry out methods described herein, and/or to execute or act as the various modules, units, etc. More than one computing device 1 may be included in, and one or more computing devices 1 may act as the components of, a system according to embodiments of the invention.

Operating system 3 may be or may include any code segment (e.g., one similar to executable code 5 described herein) designed and/or configured to perform tasks involving coordination, scheduling, arbitration, supervising, controlling or otherwise managing operation of computing device 1, for example, scheduling execution of software programs or tasks or enabling software programs or other modules or units to communicate. Operating system 3 may be a commercial operating system. It will be noted that an operating system 3 may be an optional component, e.g., in some embodiments, a system may include a computing device that does not require or include an operating system 3.

Memory 4 may be or may include, for example, a Random-Access Memory (RAM), a read only memory (ROM), a Dynamic RAM (DRAM), a Synchronous DRAM (SDRAM), a double data rate (DDR) memory chip, a Flash memory, a volatile memory, a non-volatile memory, a cache memory, a buffer, a short-term memory unit, a long-term memory unit, or other suitable memory units or storage units. Memory 4 may be or may include a plurality of possibly different memory units. Memory 4 may be a computer or processor non-transitory readable medium, or a computer non-transitory storage medium, e.g., a RAM. In one embodiment, a non-transitory storage medium such as memory 4, a hard disk drive, another storage device, etc. may store instructions or code which when executed by a processor may cause the processor to carry out methods as described herein.

Executable code 5 may be any executable code, e.g., an application, a program, a process, task, or script. Executable code 5 may be executed by processor or controller 2 possibly under control of operating system 3. For example, executable code 5 may be an application that may identify cyber-attacks on a computing device of a protected computer network, as further described herein. Although, for the sake of clarity, a single item of executable code 5 is shown in FIG. 1, a system according to some embodiments of the invention may include a plurality of executable code segments similar to executable code 5 that may be loaded into memory 4 and cause processor 2 to carry out methods described herein.

Storage system 6 may be or may include, for example, a flash memory as known in the art, a memory that is internal to, or embedded in, a micro controller or chip as known in the art, a hard disk drive, a CD-Recordable (CD-R) drive, a Blu-ray disk (BD), a universal serial bus (USB) device or other suitable removable and/or fixed storage unit. Data representing computer network traffic may be stored in storage system 6 and may be loaded from storage system 6 into memory 4 where it may be processed by processor or controller 2. In some embodiments, some of the components shown in FIG. 1 may be omitted. For example, memory 4 may be a non-volatile memory having the storage capacity of storage system 6. Accordingly, although shown as a separate component, storage system 6 may be embedded or included in memory 4.

Input devices 7 may be or may include any suitable input devices, components, or systems, e.g., a detachable keyboard or keypad, a mouse, and the like. Output devices 8 may include one or more (possibly detachable) displays or monitors, speakers and/or any other suitable output devices. Any applicable input/output (I/O) devices may be connected to Computing device 1 as shown by blocks 7 and 8. For example, a wired or wireless network interface card (NIC), a universal serial bus (USB) device or external hard drive may be included in input devices 7 and/or output devices 8. It will be recognized that any suitable number of input devices 7 and output device 8 may be operatively connected to Computing device 1 as shown by blocks 7 and 8.

A system according to some embodiments of the invention may include components such as, but not limited to, a plurality of central processing units (CPU) or any other suitable multi-purpose or specific processors or controllers (e.g., similar to element 2), a plurality of input units, a plurality of output units, a plurality of memory units, and a plurality of storage units. A neural network (NN) or an artificial neural network (ANN), e.g., a neural network implementing a machine learning (ML) or artificial intelligence (AI) function, may refer to an information processing paradigm that may include nodes, referred to as neurons, organized into layers, with links between the neurons. The links may transfer signals between neurons and may be associated with weights. A NN may be configured or trained for a specific task, e.g., pattern recognition or classification. Training a NN for the specific task may involve adjusting these weights based on examples. Each neuron of an intermediate or last layer may receive an input signal, e.g., a weighted sum of output signals from other neurons, and may process the input signal using a linear or nonlinear function (e.g., an activation function). The results of the input and intermediate layers may be transferred to other neurons and the results of the output layer may be provided as the output of the NN. Typically, the neurons and links within a NN are represented by mathematical constructs, such as activation functions and matrices of data elements and weights. A processor, e.g., CPUs or graphics processing units (GPUs), or a dedicated hardware device may perform the relevant calculations.

Figure 2:
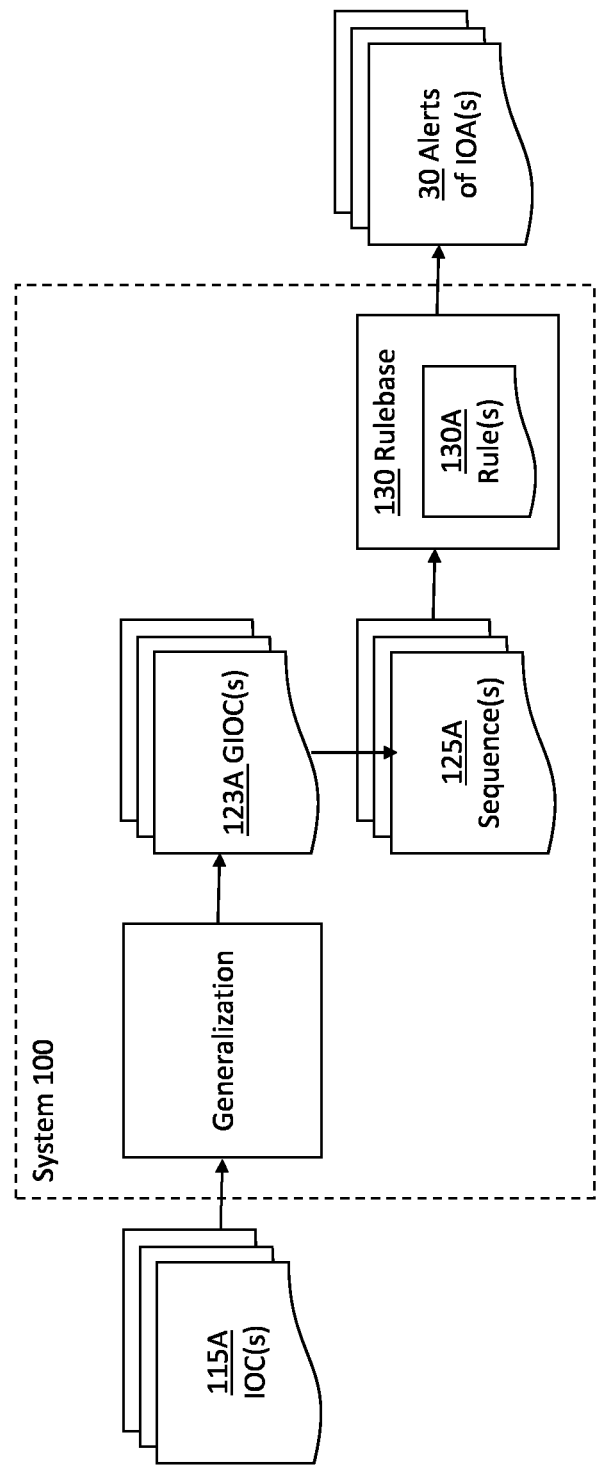
FIG. 2 is a block diagram, depicting a workflow of an installment of a system for identifying cyber-attacks on a computing device of a protected computer network, according to some embodiments.

Reference is now made to FIG. 2, which is a block diagram, depicting a workflow of an installment of a system 100 for identifying cyber-attacks on a computing device of a protected computer network, according to some embodiments;

According to some embodiments of the invention, system 100 may be implemented as a software module, a hardware module, or any combination thereof. For example, system 100 may be or may include a computing device such as element 1 of FIG. 1, and may be adapted to execute one or more modules of executable code (e.g., element 5 of FIG. 1) to identifying cyber-attacks on a computing device of a protected computer network, as further described herein.

As shown in FIG. 2, system 100 may receive (e.g., via input device 7 of FIG. 1) or obtain a plurality of indicators of compromise (IOCs) 115A from monitored traffic of a computer network, as elaborated herein. The received or obtained IOCs 115A may include, for example: unusual outbound network traffic, anomalies in privileged user account activity, geographic irregularities (e.g., access from an unusual geographic location), login irregularities and anomalies (e.g., login failures), a change (e.g., an increase) in volume of database reads, abnormal Hyper Text Markup Language (HTML) response size, irregularly large numbers of requests for specific files, mismatched port-application traffic, suspicious registry entries, Domain Name Server (DNS) request anomalies, and the like.

It may be appreciated by a person skilled in the art, that taking into consideration the specific properties and parameters associated with each IOC, the types and characteristics of the received IOCs 115A may be extremely diverse. Such IOC parameters may include for example properties of an entity involved in the IOC (e.g., a username, a computing device, a database, a networking device, etc.), networking properties of the IOC (e.g., addresses, ports, websites, etc.), data properties of the IOC (e.g., data payloads, credentials, commands, files, etc.) and the like.

In currently available systems of cyber security, the extreme diversity of IOCs 115A may render automatic learning of suspicious sequences, or suspicious templates of network traffic infeasible, or inaccurate at best. As well known in the art, the extreme diversity of IOCs 115A causes currently available systems of cyber security to suffer from a large false-positive rate, e.g., continuous alerts of cyber-attacks, to the degree of alert fatigue.

As known in the art, a cyber attack may be characterized by an "attack vector", which includes a series of stages. In each such stage, a perpetrator may exploit vulnerabilities of a computing device or a computer network. The perpetrator may thus be referred to as traversing the attack vector.

Reference is now also made to FIG. 3, which is a schematic diagram, depicting generalization, or classification of IOCs 115A to form generalized indicators of compromise (GIOCs) 123A, according to some embodiments of the invention.

According to some embodiments, system 100 may generalize IOCs 115A by omitting or generalizing properties of incoming IOCs 115A, to produce a set of GIOC data elements 123A. The set of GIOC data elements 123A may include a predefined number of GIOCs 123A, selected so as to represent all aspects of the incoming IOCs 115A that may be considered relevant to cyber-attacks. The produced set of GIOC data elements 123A may thus represent the occurrence or influx of GIOCs in a lossy, or lossless manner.

For the purpose of gaining intuition, each GIOC 123A may be regarded, for example, as representing a specific technique for implementing a step or a stage of an attack vector. In other words, each GIOCs 123A may be categorized as, or pertain to one or more specific stages of an attack vector.

For example, and as shown in the non-limiting example of FIG. 3, an attack vector may include a stage of reconnaissance (leftmost column), where a perpetrator may attempt to gather initial information regarding the target victim. The action or stage of reconnaissance may be performed by a set of techniques, each represented by a respective GIOC 123A. Pertaining to the same example, a first "reconnaissance" GIOC 123A may be, or may correspond to a technique of active scanning of at least one computer or workstation, a second "reconnaissance" GIOC 123A may be, or may correspond to a technique of gathering of victim host information (e.g., Host ID), a third "reconnaissance" GIOC 123A may be, or may correspond to a technique of gathering of victim identity information (e.g., name), etc.

In another example, another attack vector stage may be "privilege escalation" (sixth column), where a perpetrator may attempt to escalate their privileges in the victim's computer network and/or workstation, so as to allow them to perform administrative actions. The action or stage of privilege escalation may be performed by a set of techniques, each represented by a respective GIOC 123A. A first "privilege escalation" GIOC 123A may be, or may correspond to a technique of abusing an elevation control mechanism. A second "privilege escalation" GIOC 123A may correspond to a technique of manipulating an access token, etc.

It may be appreciated that GIOCs 123A may represent a generalization of IOC 115A occurrences on one hand, and represent techniques for implementing steps in an attack vector on the other hand. In this respect, GIOCs 123A may associate between a multitude of events or occurrences of IOCs 115A and specific, corresponding techniques for achieving steps in the attack vector.

According to some embodiments, system 100 may employ one or more generalization rules or templates to perform classification or generalization of IOCs 115A into GIOCs 123A. It may be appreciated that the effort of determining these generalization rules may be a one-time effort, and may allow to generalize IOCs 115A into GIOC data elements 123A in a plurality of instances or installments of system 100.

As shown in the example of FIG. 3, the predefined number of GIOCs may be as limited as 184 different GIOCs 123A. It has been experimentally shown that such a subset of 184 GIOCs 123A may sufficiently represent a very large (e.g., in the order of trillions) of IOCs 115A and/or combinations of IOCs 115A, that may be included in a similarly diverse set of cyber-attacks.

As shown in FIG. 2, system 100 may produce, from GIOCs 123A (generated from the incoming IOCs 115A), one or more sequence data structures 125A.

Figure 4:
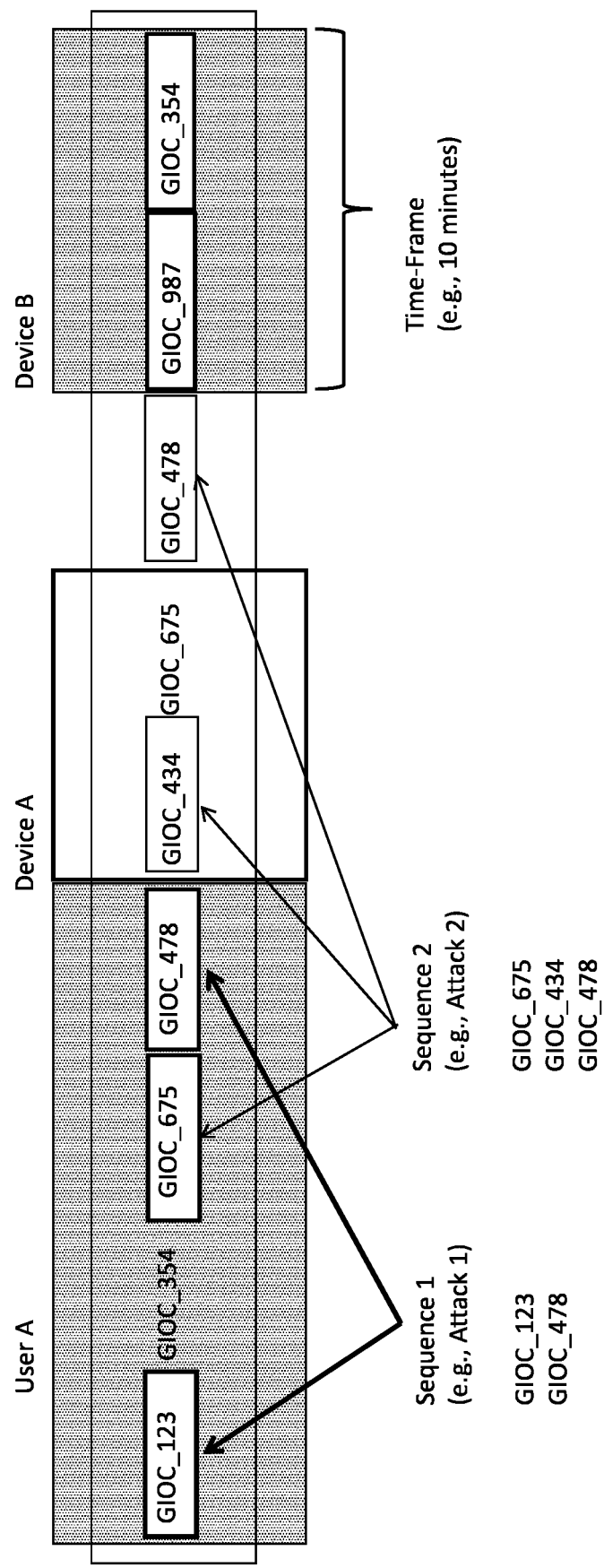
FIG. 4 is a schematic diagram, depicting chronological aggregation of GIOCs to form sequences of suspected cyber-attacks, according to some embodiments.

Reference is now made to FIG. 4, which is a schematic diagram, depicting chronological aggregation of GIOCs 123A to form sequences of suspected cyber-attacks, according to some embodiments.

According to some embodiments, each sequence data structures 125A may be, or may include a chronologic aggregation of one or more GIOC data elements 123A. The aggregated of one or more GIOC data elements 123A may pertain to a specific, or one or more specific network entities of the protected network. Such network entities may include for example one or more specific users, one or more specific workstations, one or more specific computing server and/or storage server, and the like. Additionally, or alternatively, each sequence data structures 125A may pertain or corresponds to a time window of a predefined length.

As shown in the non-limiting example of FIG. 4, a first sequence data structure 125A, denoted as "Sequence 1" may pertain to a first cyber-attack, e.g., "Attack 1" against one or more computing devices associated with a specific user, e.g., "User A". This sequence may include a chronological aggregation of two GIOCs 123A (e.g., enumerated GIOC_123 and GIOC_478).

In other words, system 100 may recognize appearance of a first GIOC 123A (GIOC_123, e.g., elevation of a user's privileges) followed by a second GIOC 123A (GIOC_478, e.g., uploading of a data file by the user), both associated with specific user A, and both occurring within a predefined, marked time window or time frame, as constituting a cyber-attack, with high probability.

As shown in FIG. 2, system 100 may analyze the at least one sequence data structure 125A, based on a rule-base data structure, to identify an indication of attack (IOA) on a computing device of the protected computer network.

Figure 5:
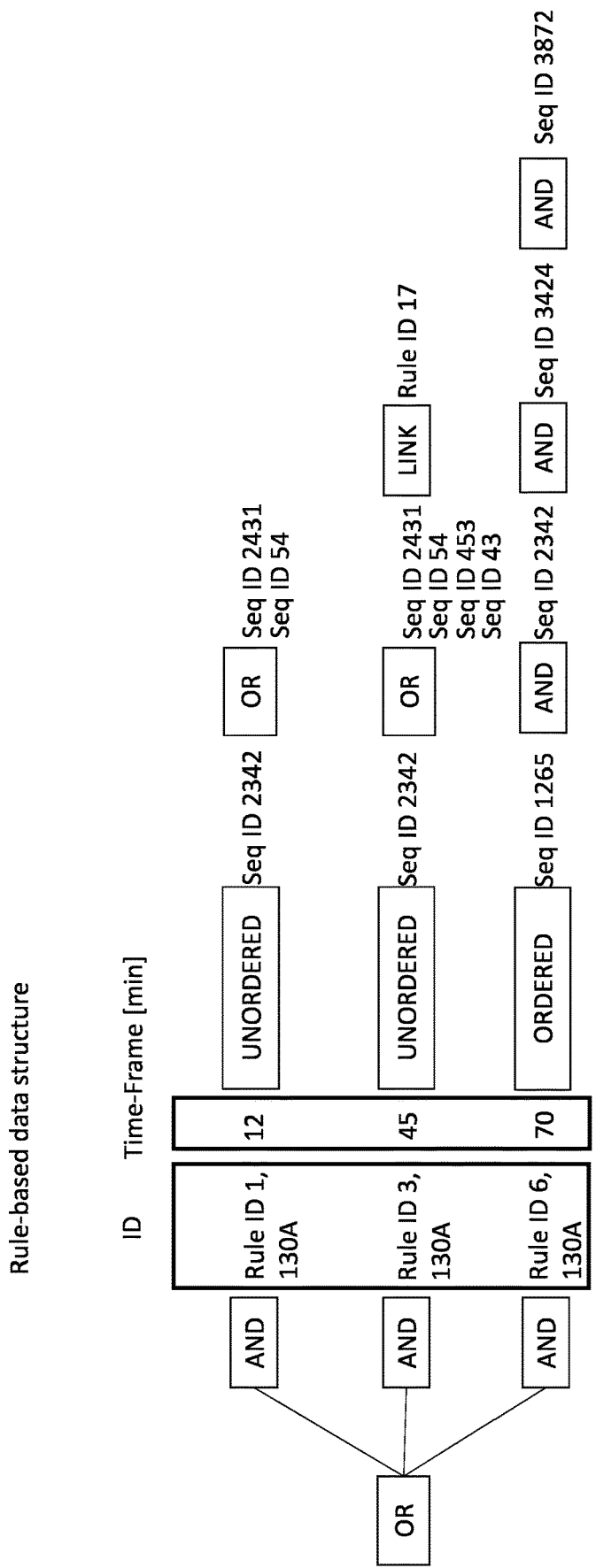
FIG. 5 is a schematic diagram, depicting a rule-base data structure, that may include a plurality of associated sequences, according to some embodiments.

Reference is now also made to FIG. 5, which is a schematic diagram, depicting a rule-based data structure, according to some embodiments. As shown in the non-limiting example of FIG. 5, the rule-base data structure may be, or may include one or more rules 130A. Each rule 130A may correspond to one or more (typically a plurality of) associated sequence data elements.

According to some embodiments, at least one rule of the rule-base data structure may include two or more sequence data structures 125A, that may be associated by a common timeframe. Additionally, or alternatively, at least one rule of the rule-base data structure may include two or more sequence data structures 125A, that may be associated by one or more Boolean logic functions (e.g., AND, OR, NOT, etc.).

For example, as depicted in FIG. 5, Rule ID 1 may dictate that: appearance of a first sequence data structure 125A (denoted "Seq. ID 2342") AND one of two other sequence data structures 125A (denoted "Seq. ID 2431" OR "Seq. ID 54"), within the specified timeframe of 12 minutes, may constitute an indication of cyber-attack.

Additionally, or alternatively, the two or more sequence data structures 125A may be associated by at least one attribute of order (e.g., denoted "ordered" and "unordered"). For example, as depicted in FIG. 5, Rule ID 1 may dictate that appearance of the relevant two or more sequence data structures 125A (e.g., Seq. ID 2342, Seq. ID 2431, and Seq. ID 54) may be unordered, in a sense that it may not require any specific order to indicate a cyber-attack (e.g., an IOA). In a complementary manner, Rule ID 6 may dictate that appearance of the relevant sequence data structures 125A (e.g., Seq. ID 1265, Seq. ID 2342, Seq. ID 3424 and Seq. ID 3877) must be ordered, in a sense that they must adhere to the dictated order or sequence (e.g., Seq. ID 1265, and then Seq. ID 2342, and then Seq. ID 3424 and then Seq. ID 3877), in order to indicate a cyber-attack (e.g., an IOA).

Additionally, or alternatively, one or more rules of the rule-base data structure may be linked, so as to enable substitution of at least one portion of a first rule by a second rule.

For example, as depicted in FIG. 5, Rule ID 3 may be linked to Rule ID 17, in a sense that conditions of rule ID 17 must be fulfilled, in addition to appearance of sequence data structures 125A of rule ID 3 (e.g., Seq. ID 2342, Seq. ID 2431, etc.), within the specified timeframe of 45 minutes, to trigger rule ID 3.

Figure 6:
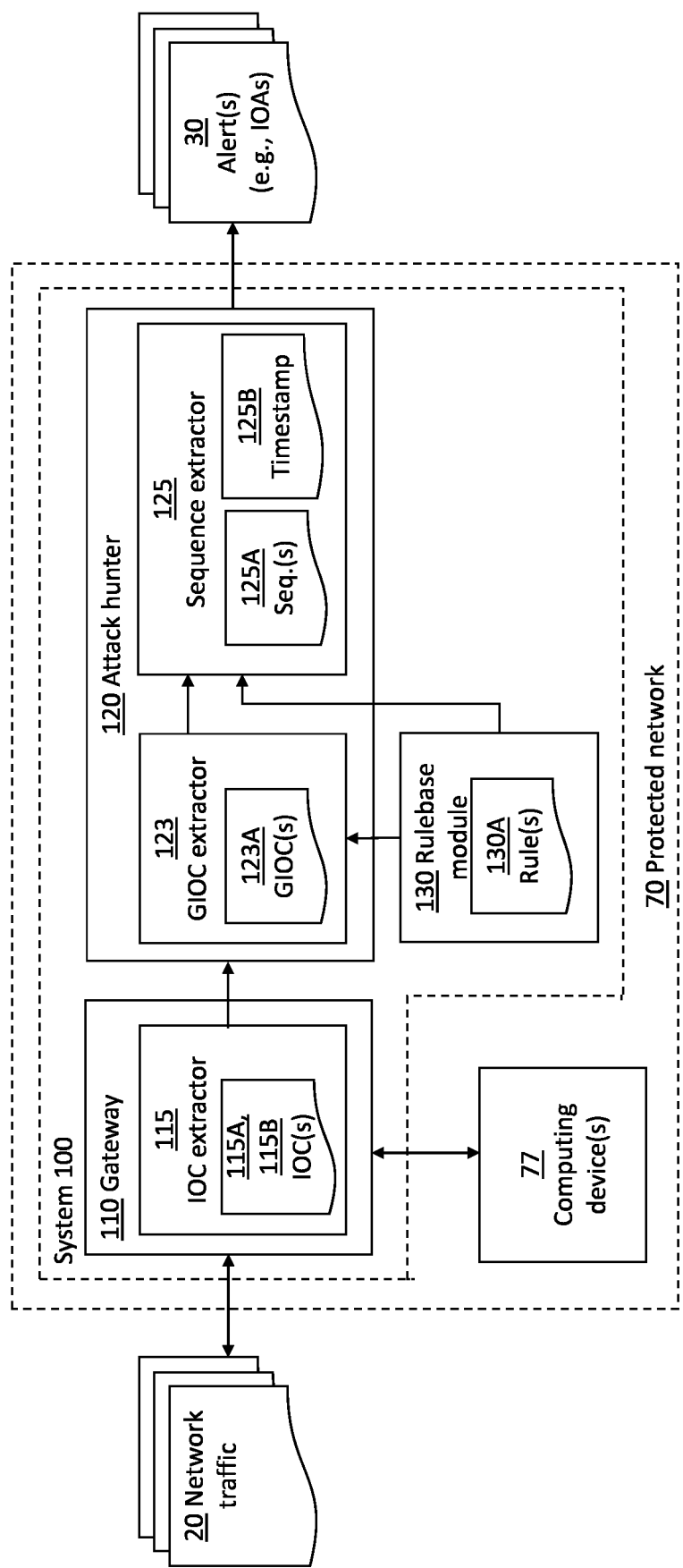
FIG. 6 is a block diagram, depicting a system for identifying cyber-attacks on a computing device of a protected computer network, according to some embodiments.

Reference is now made to FIG. 6, which is a block diagram, depicting a system 100 for identifying cyber-attacks on a computing device 77 of a protected computer network 70, according to some embodiments.

System 100 may, for example, be instantiated, or installed as part of an organization's computing network 70, and may be adapted to identify indications of cyber-attacks either from beyond protected computer network 70 (e.g., via the Internet) or within protected computer network 70.

As shown in FIG. 6, arrows may represent flow of one or more data elements to and from system 100 and/or among modules or elements of system 100. Some arrows have been omitted in FIG. 6 for the purpose of clarity.

According to some embodiments, system 100 may include (e.g., as depicted in FIG. 6) a gateway module 110, adapted to transfer computer network traffic 20 between one or more computing devices 77 of protected computer network 70, and computing devices beyond protected computer network 70 (not drawn). Additionally, or alternatively, system 100 may not include, but be associated with gateway 110, and may transfer computer network traffic 20 via associated gateway 110.

According to some embodiments, system 100 (and/or gateway 110) may monitor traffic of computer network data 20 via a gateway 110 to and/or from protected network 70. Additionally, in embodiments where system 100 includes gateway 110, gateway 110 may monitor traffic of protected computer network 70 via gateway 110.

According to some embodiments, and as depicted in FIG. 6, gateway 110 may include an IOC extractor module 115, configured to extract one or more IOCs 115A from monitored network traffic 20. The extracted one or more IOCs 115A may be, or may include a data element that may indicate or represent a network security compromise.

For example, IOC extractor module 115 may include a network traffic metadata table 115B, where each entry in the network traffic metadata table 115B corresponds to a single IOC 115A. IOC extractor module 115 may monitor network traffic 20 by logging or collecting metadata of network traffic 20 into metadata table 115B. According to some embodiments, one or more (e.g., each) entry in the network traffic metadata table 115B may include an IOC identification number (ID), a timestamp, and a description or representation of the relevant IOC 115A (e.g., raising access permissions for a specific user, failure of login access of a specific workstation, etc.).

According to some embodiments, system 100 may include an attack hunter module 120, adapted to identify suspicious computer network traffic 20, and optionally thwart cyber attacks via network traffic 20.

According to some embodiments, attack hunter module 120 may include a GIOC extraction module 123, adapted to classify or generalize the extracted IOCs 115A to produce one or more GIOC data elements 123A, as elaborated herein (e.g., in relation to FIG. 2 and/or FIG. 3).

Additionally, or alternatively, attack hunter module 120 may include a sequence extraction module 125, adapted to chronologically aggregate the one or more GIOC data elements 123A, to produce at least one sequence data structure 125A, as elaborated herein (e.g., in relation to FIG. 2 and/or FIG. 4). The term "chronologically aggregate" may be used herein to refer to an accumulation or listing of a plurality of data elements, ordered according to their chronological appearance (e.g., over time).

The at least one sequence data structure 125A may pertain to one or more specific network entities of the protected network, and may correspond to a time window of a predefined length.

For example, sequence extraction module 125 may include two GIOCs that occurred in relation to a specific user and/or a computing device associated with that user within a sequence data structure 125A, but may exclude from the sequence data structure 125A a third GIOC that relates to a different user. Alternatively, sequence extraction module 125 may identify, from extracted IOCs 115A a change in entity, from a first entity to a second entity (e.g., a user who has switched from a first workstation to a second workstation), and include in the sequence data structure 125A a third GIOC that corresponds to the second entity.

In another example, sequence extraction module 125 may include two GIOCs that appeared within a predefined period of time from a relevant timestamp 125B within a sequence data structure 125A, but may exclude from the sequence data structure 125A a third GIOC that appeared or occurred after that time period.

According to some embodiments, attack hunter module 120 may include a rulebase module 130. Rulebase module 130 may include or maintain a rulebase data structure 130A that may be, or may include one or more rule data elements 130A (or "rules 130A") as elaborated herein (e.g., in relation to FIG. 5). According to some embodiments, attack hunter module 120 may be configured to analyze the at least one sequence data structure 125A, based on the rule-base data structure 130A, to identify an indication of attack on a computing device 77 of protected computer network 70.

In other words, attack hunter module 120 may be configured to check whether at least one rule 130A has been "triggered", in a sense that conditions of at least one rule data element 130A have been fulfilled. As elaborated herein (e.g., in relation to FIG. 5), these conditions may include one or more of: a timeframe of IOC 115A occurrence(s) in a sequence, occurrence of the IOC 115A events in a specific order, or in an unordered manner, logical conditions (e.g., Binary conditions such as AND, OR, NOT, etc.) between IOCs 115A, dependence or linkage between sequences, and the like. Attack hunter module 120 may analyze or check one or more sequence data structures 125A vis-à-vis rule data elements 130A in relation to specific entities such as servers, workstations, web-pages, databases, and the like. Based on this analysis (e.g., if a sequence 125A has triggered a rule 130A), attack hunter module 120 may determine whether a suspected cyber-attack has been performed on the relevant entities.

For example, as presented in the non-limiting example of FIG. 5, if the at least one sequence data structure 125A includes sequences (Seq ID 2342 OR (Seq ID 2431 AND Seq ID 54)), within a timeframe of 12 minutes, then attack hunter module 120 may determine that rule ID 1 has been triggered, and that a corresponding cyber-attack is underway.

According to some embodiments, following a trigger of a rule of rulebase data structure 130A, attack hunter module 120 may produce or emit (e.g., via output device 8 of FIG. 1) at least one notification 30, such as an alert notification 30. Alert notification 30, may for example indicate a likelihood that one or more specific sequence data structures 125A are associated with an IOA against a computing device 77 of protected network 70.

Pertaining to the same example, after triggering rule ID 1, attack hunter module 120 may emit an alert notification 30 that may indicate the suspected IOA, and provide the relevant information (e.g., related IOCs 115A) that pertains to the suspected cyber-attack, to be displayed to an administrative user (e.g., via an output element 8, such as a computer screen).

Additionally, or alternatively, notification 30 may include a command to one or more network components (e.g., switches, routers, gateways, etc.) such as gateway 110, adapted to block or thwart the underlying cyber-attack (e.g., by blocking one or more data transmissions of network traffic 20, disabling one or more communication ports or sockets, and the like).

Figure 7:
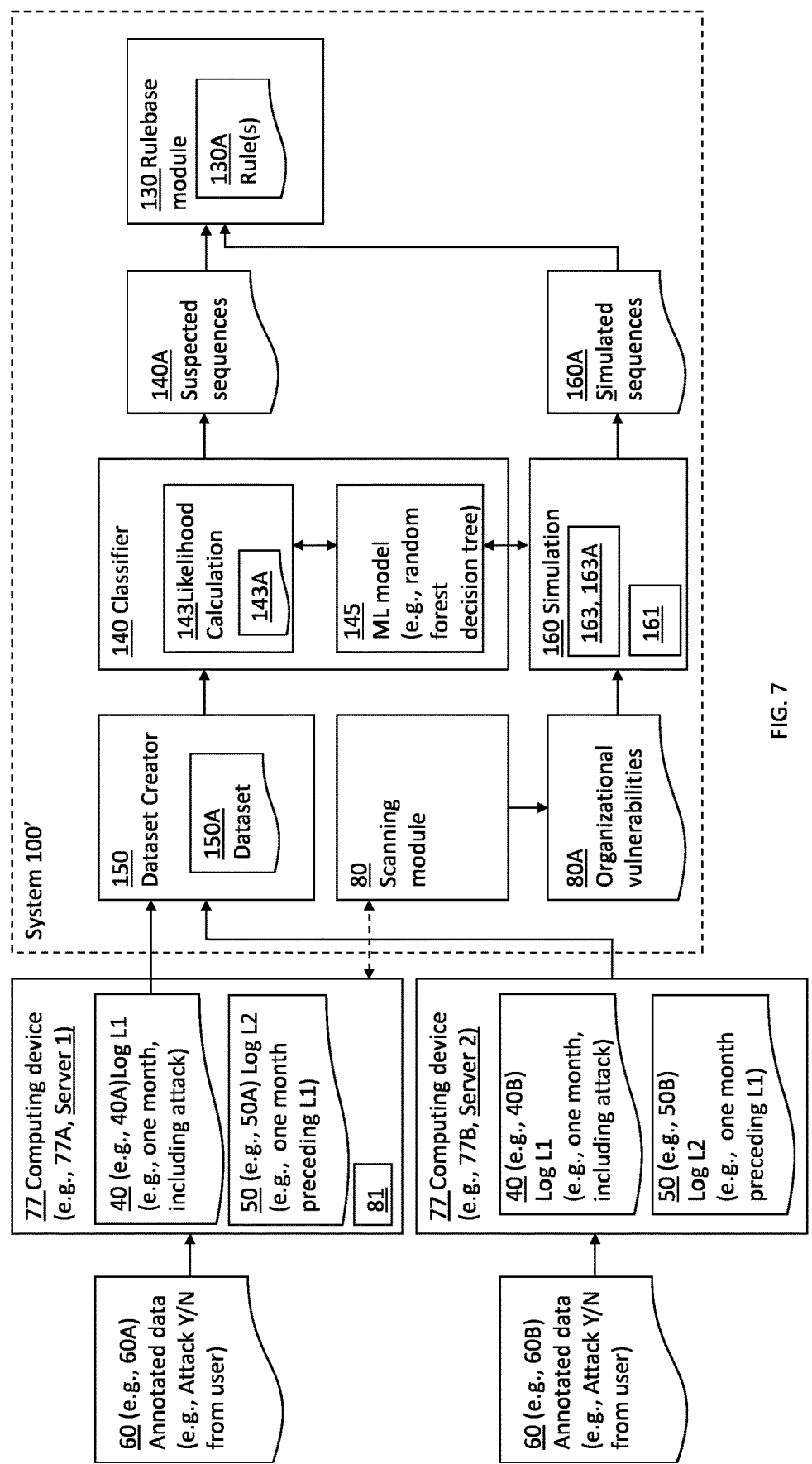
FIG. 7 is a block diagram, depicting a system for identifying cyber-attacks on a computing device of a protected computer network, according to some embodiments.

Reference is now made to FIG. 7, which is a block diagram, depicting a system 100' for identifying cyber-attacks on a computing device of a protected computer network, according to some embodiments.

According to some embodiments, system 100' of FIG. 7 may be the same as system 100, depicted in the example of FIG. 6 (e.g., implemented on the same computing device), and may include the same modules of system 100 of FIG. 6. In this context, system 100 and system 100' may be used interchangeably. It may be appreciated that in such embodiments, modules of system 100 as depicted in FIG. 6 may be included in system 100' of FIG. 7, but have been omitted in FIG. 7 for the purpose of clarity.

Additionally, or alternatively, system 100' of FIG. 7 may be implemented separately from system 100 depicted in the example of FIG. 6. For example, system 100' of FIG. 7 may be implemented on a cloud server computing device, and system 100 of FIG. 6 may be implemented or installed on a computing device 77 in protected network 70. In such embodiments, system 100' of FIG. 7 may produce rulebase data structure 130A as elaborated herein, and may collaborate with system 100 of FIG. 6, to apply rulebase data structure 130A, so as to identify indications of cyber-attacks and/or produce alerts 30 indicating an IOA, as elaborated herein.

According to some embodiments, system 100' may include a classifier module 140. Classifier module 140 may, include a machine learning (ML) based classification model 145, trained to predict a likelihood of a sequence data structure 125A (e.g., sequence data structure 125A of FIG. 6) to be associated with a cyber-attack.

For example, ML-based classification model 145 may be, or may include a random forest decision tree model, wherein each node of the random forest decision tree model (or a "feature" as commonly referred to in the art) may represent a specific sequence data structure 125A.

According to some embodiments, system 100' may introduce at least one sequence data structure 125A to ML-based classification model 145 as input, and may predict a likelihood of the sequence data structure 125A to be associated with a cyber-attack, as elaborated herein.

According to some embodiments, system 100' may include a dataset creator module 150. Dataset creator module 150 may be adapted to receive, or obtain GIOCs 123A from one or more (e.g., a plurality) of computing devices 77 (e.g., 77A, 77B) that may, for example, be deployed on one or more secured networks 70 around the world (pertaining to one or more organizational computer networks).

Dataset creator 150 may collaborate with sequence extractor module 125, to extract or produce from the obtained GIOCs one or more sequence data structures 125A, as elaborated herein (e.g., in relation to FIGS. 4 and/or 6). Dataset creator 150 may aggregate the produced sequence data structure 125A in a dataset data element 150A, such as a list, a table, and the like, on a storage device or database (e.g., element 6 of FIG. 1).

Classifier module 140 may calculate a likelihood value 143A of at least one sequence data structure 125A in a dataset data element 150A, representing a likelihood of the relevant sequence data structure 125A to pertain to a cyber-attack.

Classifier module 140 may then introduce dataset 150A, and/or likelihood value 143A as input to ML-based classification model 145. It may be appreciated that the input dataset 150A may be, or may be included in a training dataset, as part of a training phase of ML model 145.

Additionally, or alternatively, input dataset 150A may be, or may be included in inference data, as part of an inference phase of ML model 145.

Additionally, or alternatively, classifier module 140 may be configured to train ML model 145 as an on-going process, e.g., as part of an operational mode of system 100' (e.g., during the inference stage).

For example, system 100' may be employed by one or more computing devices or servers 77 (e.g., 77A, 77B) of protected network 70 to continuously monitor network traffic via a gateway of the protected network, extract GIOC sequences, and produce alerts 30 against GIOC sequences that are suspected to be cyber-attacks, as elaborated herein. System 100' may occasionally (e.g., during the monitoring of network traffic) receive (e.g., from one or more servers 77) an indication 60 of occurrence of a cyber-security event, in which an unrecognized compromise of protected network 70 has taken place. Indication of compromise 60 may, for example be received from a user of server 77, e.g., via input device 7 of FIG. 1, and may include annotated data 60 regarding characteristics of the suspected attack. System 100' may subsequently communicate with the relevant one or more servers 77, to produce a "dump" (as commonly referred to in the art) of log files 40 that include a multitude of IOCs 115A. The dumped logs 40 may be analyzed by GIOC extractor 123 to produce a GIOC representation of the logged IOCs 115A. Dataset creator 150 may then produce or update dataset 150A to include the GIOCs involved in the suspected attack, adjoint with the relevant annotation 60.

Subsequently, as elaborated herein, ML model 145 may predict a likelihood of a sequence data structure 125A included in dataset 150A to be associated with a cyber-attack or IOA. In other words, ML model may extract from the one or more input sequence data structures 125A (e.g., of dataset 150A) at least one suspected sequence data structure 125A. Classifier module 140 may thus automatically analyze historical suspected events to identify sequences that were included in attack. The identified suspected sequences may then be used by attack hunter 120 to identify suspicious GIOC sequences in real time, or near-real time.

The term "suspected" may be used in this context to indicate a sequence data structure 125A that may have been identified by ML model 145 as highly indicative of a cyber-attack, and/or that may require a specific action or alert notification.

According to some embodiments, rulebase module 130 may receive the calculated likelihood 143A and/or the relevant, suspected sequence data structure 140A, and may determine, or produce therefrom at least one rule, associating the at least one suspected sequence data structure to an IOA, based on the predicted likelihood 143A. Rulebase module 130 may subsequently aggregate or append the at least one determined rule, to produce or obtain rule-base data structure 130A.

According to some embodiments, system 100' may train ML model 145 based on an aggregation of sequence data structures 125A and/or one or more labeled or annotated data elements 60 (e.g., 60A, 60B), received from a user (e.g., via input device 7 of FIG. 1).

For example, system 100' may receive or obtain (a) at least one annotation data element 60 (e.g., 60A, 60B), indicating that a cyber-attack has suspectedly occurred, and (b) a first log data structure 40 (e.g., a log file, such as elements 40A, 40B) that may include GIOCs and/or IOCs corresponding to a first timeslot during which the suspected cyber-attack has occurred. The first timeslot may, for example include a period of one month preceding the current time, or one month preceding a time at which the suspected attack has occurred.

According to some embodiments, sequence extractor 125 may produce from the log file 40 of the first period one or more sequence data structures 125A, as elaborated herein (e.g., in relation to FIG. 2 and/or FIG. 4). System 100' may thus perform chronological aggregation of a plurality of sequence data structures 125A corresponding to the first timeslot. System 100' may subsequently train ML based classification model 145 to predict the likelihood of at least one sequence data structure 125A to be associated with a cyber-attack (e.g., an indication of attack). In other words, system 100' may train ML model 145 to predict or extract at least one sequence data structure 140A that may be suspected to be associated with a cyber-attack.

According to some embodiments, the training of ML model 145 may include any method of supervised training as known in the art, and may be based on the sequence data structures 125A of the first timeslot as a training dataset, and the at least one annotation data element 60 as supervisory data.

According to some embodiments, system 100' may receive or obtain (e.g., via input device 7 of FIG. 1) a second log data structure 50 (e.g., a second log file). Second log data structure 50 may include GIOCs and/or IOCs corresponding to a second timeslot.

For example, the first timeslot (e.g., of log 40) may correspond to a period that includes the suspected cyber-attack, and the second timeslot (e.g., of log 50) may correspond to a period that predates the suspected cyber-attack and/or the first period. For example, the first period may go backwards, e.g., from the current time until 1 month before the current time, and the second period may go backwards, e.g., from 1 month before the current time until 2 months from the current time.

According to some embodiments, sequence extractor 125 may produce, from the log file 50 of the second period one or more sequence data structures 125A, as elaborated herein (e.g., in relation to FIG. 2 and/or FIG. 4). System 100' may thus perform chronological aggregation of a plurality of sequence data structures 125A corresponding to the second timeslot (e.g., of log 50). System 100' may subsequently train ML based classification model 145 to predict the likelihood of at least one sequence data structure 125A to be associated with a cyber-attack (e.g., an indication of attack). In other words, system 100' may train ML model 145 to predict or extract at least one sequence data structure 140A that may be suspected to be associated with a cyber-attack.

The training of ML model 145 may include any method of supervised training as known in the art, and may be based on the sequence data structures 125A of the first timeslot, and the sequence data structures 125A of the second timeslot as a training dataset, and the at least one annotation data element 60 as supervisory data.

According to some embodiments of the invention, ML based classification model may be implemented as a decision tree, where each node (or "feature, as commonly referred to in the art) may represent a specific sequence data structure 125A, that includes one or more GIOCs, as elaborated herein (e.g., in relation to FIG. 4). Additionally, classifier module 140 may include a likelihood calculation module 143, adapted to calculate a likelihood value 143 of one or more nodes (e.g., sequence data structures 125A) of classification model 145, as known in the art. Classifier module 140 may then train ML based, random forest classification model 145 based on the calculated likelihood value 143, as elaborated herein.

Reference is now also made to FIG. 8, which is a table, representing an example of annotated data regarding pertinence of one or more sequence data structures 125A to a suspected cyber-attack, according to some embodiments.

As explained herein (e.g., in relation to FIG. 7), dataset creator module 150 may receive, or obtain GIOCs 123A from one or more (e.g., a plurality) of computing devices 77 (e.g., 77A, 77B), and likelihood calculation module 143 may calculate a likelihood 143A that a relevant sequence data structure 125 pertains to a cyber-attack or IOA.

As known in the art, a "Gini Impurity" value is a measurement or metric used to build decision trees to determine how the features of a dataset should split nodes to form the tree. In other words, a Gini impurity of a dataset is a numerical value that may indicate a likelihood of new, random data to be misclassified if it were given a random class label according to the class distribution in the dataset.

According to some embodiments, likelihood calculation module 143 may be or may include a Gini impurity calculation module, and likelihood value 143A may represent a calculated Gini impurity value, based on data such as in the example of FIG. 8, as elaborated herein.

Additionally, or alternatively, likelihood value 143A may represent a value of correlation between a specific sequence data structure 125A, and a likelihood that the relevant sequence data structure 125A pertains to a cyber-attack, as elaborated herein.

As shown in FIG. 8, each pair of entries (denoted by greyscale color) may relate to a specific network entity such as a specific computing device or server of protected network 70. These network entities are denoted as elements 77A and 77B of FIG. 7, and as Servers 1, 2, 3 and 4 in the table example of FIG. 8.

As elaborated herein (e.g., in relation to FIG. 7), at least one computing device 77 (e.g., 77A, 77B, of FIG. 7 and/or Servers 1, 2, 3 and 4 of FIG. 8) may receive at least one annotation data element 60 (e.g., 60A, 60B, of FIG. 7), indicating that a cyber-attack has suspectedly occurred.

The second entry of each pair, denoted as timeframe A, may relate to a timeframe that includes the suspected cyber-attack, for each respective server, and to a corresponding, first log 40 (e.g., elements 40A, 40B of FIG. 7). The first entry of each pair, denoted as timeframe B, may relate to a timeframe preceding a suspected cyber-attack, for each respective server, and to a corresponding, second log 50 (e.g., elements 50A, 50B of FIG. 7).

As shown in FIG. 8, each column (e.g., Seq. ID 1, 2, 3 and 4) may pertain to occurrence (or lack thereof) of a corresponding sequence 125A (e.g., Seq. ID 1, 2, 3 and 4) during the corresponding periods or timeframes (e.g., including, or preceding that suspected cyber-attack) and in relation to each computing device (e.g., servers 1, 2, 3 and 4).

According to some embodiments, likelihood calculation module may calculate a value of a likelihood value P(n) (denoted as element 143A in FIG. 7) according to equation Eq. 1 below:

$$P(n)=\Sigma_{n=1}^{J}A(n)-B(n) \qquad \text{Eq. 1}$$

Where J is the total number of computing devices from which relevant data was obtained (e.g., 4, in the example of FIG. 8);

n is the index of severs (e.g., 1,2,3 and 4, in the example of FIG. 8);

P(n) is the value of the calculated likelihood value;

A(n) is a binary value representing occurrence ('1') of a specific sequence or lack thereof ('0') in period A (e.g., including the suspected attack); and B(n) is a binary value representing occurrence ('1') of a specific sequence or lack thereof ('0') in period B (e.g., preceding period A).

It may be appreciated that likelihood value P(n) 143A as calculated in the example of Eq. 1 may represent a correlation between a specific sequence data structure 125A, and a likelihood that the relevant sequence data structure 125A pertains to a cyber-attack. For example, a maximum value of 1 may represent complete correlation between sequence data structure 125A and the suspected attack (e.g., as shown in relation to Seq ID 1), a minimal value of −1 may represent reverse, or negative correlation between sequence data structure 125A and the suspected attack (e.g., as shown in relation to Seq ID 3); and a value of 0 may represent no correlation between sequence data structure 125A and the suspected attack (e.g., as shown in relation to Seq ID 4).

According to some embodiments, classifier module 140 may train ML-based classification model 145 based on the likelihood value 143A. For example, if a calculated likelihood value 143A represents high correlation (e.g., 0.9) between a specific sequence data structure 125A and occurrence of cyber-attacks, then the corresponding feature of ML-model 145 (e.g., corresponding sequence data structure 125A) may be regarded as pertaining to a cyber-attack, and the random forest decision tree may be trained accordingly. In a complementary manner, if a calculated likelihood value 143A represents low (e.g., 0.01), or negative (e.g., −0.8) correlation between a specific sequence data structure 125A and occurrence of cyber-attacks, then the corresponding feature of ML-model 145 (e.g., corresponding sequence data structure 125A) may be regarded as not pertaining to a cyber-attack, and the random forest decision tree may be trained accordingly.

Additionally, or alternatively, likelihood calculation module 143 may calculate likelihood value 143A as a Gini impurity value. In such embodiments, the Gini impurity 143A of a sequence data structure 125A may refer to a likelihood of the sequence data structure 125A to be included in a specific cyber-attack. In other words, Gini impurity calculation module 143 may calculate the Gini impurity of each feature (e.g., each sequence data structure 125A) of the random forest decision tree, as a likelihood of being included in a specific cyber-attack.

According to some embodiments, the Gini impurity value may be calculated according to equation Eq. 2 below:

$$\text{Gini}(K)=\Sigma_{i\in N}P(i,K)\cdot(1-P(i,K)) \qquad \text{Eq. 2}$$

where N is the size of the list of classes (e.g., '0' and '1' in this example)

K is the category and

P(i, K) is the likelihood of category K having class i.

According to some embodiments, likelihood calculation module 143 may compare the calculated likelihood value 143A (e.g., that is a Gini impurity value) to a predefined threshold, and classifier module 140 may train ML-based classification model 145 (e.g., the random forest decision tree) based on the comparison. For example, if the calculated likelihood value 143A (e.g., the Gini impurity value) is low (e.g., does not surpass the predefined threshold) then the corresponding feature (e.g., corresponding sequence data structure 125A) may be regarded as pertaining to a specific cyber-attack, and the random forest decision tree may be trained accordingly. In a complementary manner, if the calculated Gini impurity value is high (e.g., surpasses the predefined threshold) then the corresponding feature (e.g., corresponding sequence data structure 125A) may be regarded as not pertaining to a specific cyber-attack, and the random forest decision tree may be trained accordingly.

According to some embodiments, system 100/100' may include a scanning module 80, adapted to scan one or more entities of protected computer network 70, to obtain one or more known security vulnerabilities. The scanned entities may include, for example computing devices 77 such as servers, workstations, mobile computing devices (e.g., Smartphones), and the like. Additionally, or alternatively, the scanned entities may include modules that are installed, or included in computing devices 77, such as software modules, web-pages, databases, local storage devices and the like.

According to some embodiments, and as shown in FIG. 7, scanning module 80 may be a service that is installed on, or included in a central portion of system 100/100', and may communicate (e.g., via the Internet) directly with computing devices 77, to ascertain vulnerabilities of the relevant computing devices 77. Additionally, or alternatively, scanning module 80 may communicate with dedicated, corresponding module(s) such as client or agent modules 81, that are locally installed on the one or more computing devices 77.

According to some embodiments, scanning module 80 may scan the one or more entities of protected network 70 by querying computing device(s) 77 for known organizational vulnerabilities 80A. Scanning module 80 may subsequently produce a data structure (e.g., a list) of organizational vulnerabilities 80A, based on results of the scan of computing devices 77.

Non-limiting examples of organizational vulnerabilities 80A that are known in the art include: allowing domains or accounts to expire (e.g., when an administrator allows a domain name or e-mail account to expire, through neglect); buffer overflow; business logic vulnerability; CRLF (Carriage Return Line Feed) Injection (e.g., a vulnerability that occurs when an attacker injects a CRLF character sequence where it is not expected); CSV (Comma Separated Values) Injection (e.g., when a website embeds untrusted input inside a CSV file); catching NullPointerException; covert storage channel (a process that involves direct or indirect writing to a storage location by one process and subsequent direct or indirect reading of the storage location by another process); deserialization of untrusted data; directory restriction error; doubly freeing memory; empty string password; expression language injection; full trust CLR (common language runtime) verification issue; exploiting passing reference types by reference; Heartbleed bug; improper data validation; improper pointer subtraction; information exposure through query strings in URL; injection problems (e.g., injection of control-plane data into a data-plane in order to alter a control flow of a process); insecure compiler optimization; insecure randomness; insecure temporary file; insecure third party domain access; insecure transport (e.g., failure to ensure that SSL is used for all access controlled pages); insufficient entropy; insufficient session-ID Length; least privilege violation; memory leak (e.g., an unintentional form of memory consumption whereby a developer fails to free an allocated block of memory when no longer needed); missing error handling (e.g., lack of throwable exceptions that prevent attackers from mining information from an application container's built-in error response); missing XML validation; multiple administrative levels; null dereference (e.g., when a null-pointer dereference takes place when a pointer with a value of NULL is used as though it pointed to a valid memory area); overly permissive regular expression; PHP file inclusion (e.g., inclusion of a PHP file in a current file, to provide or extend the functionality of the current file); PHP object injection; PRNG (Pseudo Random Number Generator) Seed Error (e.g., incorrect use of a seed by a PRNG); password management vulnerabilities; hard-coded passwords; password plaintext storage; poor logging practice; portability flaw; privacy violation; process control; return inside finally block; session variable overloading; string termination error; unchecked error condition; unchecked return value missing check against null; undefined behavior; unreleased resource; unrestricted file upload; Unsafe JNI (e.g., Improper use of the Java Native Interface (JNI)); unsafe mobile code; unsafe function call from a signal handler; unsafe use of reflection (e.g., unsafe use of the reflection mechanisms in programming languages like Java or C #); use of obsolete methods; use of hard-coded password; using a broken or risky cryptographic algorithm; using freed memory; vulnerability template; and XML External Entity (XXE) Processing (e.g., a type of attack against an application that parses XML input).

According to some embodiments, system 100' may include a simulation module 160, configured to receive one or more organizational vulnerabilities 80A, and produce one or more simulated attack sequences 160A based on the organizational vulnerabilities 80A.

Simulated attack sequences 160A may be, or may include a sequence of GIOCs 123A that may follow a simulated attack vector that exploits organizational vulnerabilities 80A.

For example, scanning module 80 may identify a first organizational vulnerability 80A that includes identification of accessibility of a first computer 77 from an untrusted computing device, beyond protected network 70. The first organizational vulnerability 80A may thus include, for example, an identification of the first computing device 77, an identification of a specific communication protocol for the vulnerability (e.g., the Remote Desktop Protocol (RDP)), an identification of a specific communication port (e.g., port 3389) associated with the vulnerability, and the like. In addition, scanning module 80 may identify a second organizational vulnerability 80A that includes an identification of accessibility of the first computing device 77 to a second computing device 77 of network 70. The second organizational vulnerability 80A may thus include, for example, an identification of the second computing device 77, and an identification of a specific application (e.g., an email application) over which first device 77 may send second device 77 a harmful link. In addition, scanning module 80 may identify a third organizational vulnerability 80A that includes identification of vulnerability of second device 77 to operations that may be included in the harmful link. The third organizational vulnerability 80A may thus include, for example, an identification of operations such as escalating of data-access privileges, accessing confidential data on storage, and/or sending of confidential data to an internet domain that is beyond protected network 70.

Pertaining to the example above, simulator 160 may produce a sequence of simulated IOCs 161 that corresponds to, or simulates traversal of the simulated attack vector, based on the scanned organizational vulnerabilities 80A.

In this example, IOCs of the simulated sequence 161 may include: (a) accessing first device 77 from a computer that is beyond the domain of network 70, via RDP, on port 3389; (b) sending a malicious email from first device 77 to second device 77; (c) performing actions for escalating data-access privileges on second device 77; and (d) exploiting the escalated privileges to compromise data that is stored in the organizational network, e.g., by sending the data to a domain that is beyond protected network 70.

Simulator 160 may collaborate with GIOC extractor 123, to generalize IOCs of the simulated sequence 161, so as to produce corresponding GIOC data elements (e.g., element 123A of FIG. 6). Simulator 160 may then produce, from the generalized IOCs of the simulated sequence 161, a simulated sequence of GIOCs 123A. This simulated sequence is denoted as element 160A of FIG. 7. In other words, simulated attack sequence 160A may include a sequence of GIOCs 123A, representing generalized stages along an attack vector.

It may be appreciated that two or more simulated IOC sequences 161 may, after being generalized, produce overlapping simulated GIOC sequences 160A. Simulation module 160 may thus be adapted to uniquify simulated GIOC sequences 160A, in a sense that recurring, or duplicated simulated GIOC sequences 160A may be omitted.

According to some embodiments, simulator 160 may collaborate with ML model 145 to produce simulated GIOC sequences 160A.

For example, in some embodiment, simulator 160 may include a likelihood calculation module 163, adapted to calculate a likelihood value 163A of at least one simulated GIOC sequence 160A. Likelihood value 163A may represent a calculated likelihood of the relevant simulated GIOC sequence 160A to be included in a cyber-attack, as elaborated herein (e.g., in relation to likelihood calculated module 143). In other words, likelihood value 163A may represent a calculated likelihood that a simulated GIOC sequence 160A pertains to an IOA.

Simulator 160 may then introduce simulated GIOC sequence 160A and/or calculated likelihood value 163A as input to ML-based classification model 145. As elaborated herein, ML-based classification model 145 may be trained, based on calculated likelihood value 163A to predict likelihood of a GIOC sequence to pertain to a cyber-attack.

In other words, embodiments of the invention may utilize a scan of vulnerabilities to simulate a sequence 160A of generalized IOCs, and may then utilize the sequence 160A of generalized IOCs to train ML model 145 to identify real-world IOA events.

As depicted in FIG. 7, the simulated sequence 160A of generalized IOCs may be introduced into rule-based module 130, in a similar manner to suspected sequences 140A.

According to some embodiments, rule-based module 130 may determine, or produce at least one rule 130A based on sequence 160A. For example, rule 130A may include a set of conditions as elaborated herein (e.g., in relation to FIG. 5), which attack hunter module 120 of FIG. 6 may be adapted to "catch". Additionally, or alternatively, rule 130A may include, or be associated with a definition of one or more mitigation actions which attack hunter module 120 may be adapted to implement or take, when these conditions are met (e.g., when rule 130A is "triggered").

Additionally, or alternatively, rule-based module 130 may produce at least one rule 130A further based on likelihood value 163A for mitigating cyber-attacks. For example, if likelihood value 163A surpasses a predefined threshold, then rule-based module 130 may produce the at least one rule 130A. In a complementary manner, if likelihood value 163A does not surpass the predefined threshold, then rule-based module 130 may refrain from producing the at least one rule 130A.

According to some embodiments, attack hunter module 120 of FIG. 6 may analyze or monitor one or more sequence data structures 125A vis-à-vis the at least one rule 130A, in relation to specific entities (e.g., servers, workstations, web-pages, databases, etc.). As elaborated herein, based on this analysis (e.g., if the conditions of rule 130A were met, in a sense that sequence 125A has triggered rule 130A), attack hunter module 120 may determine whether a suspected cyber-attack has been performed on the relevant entities, and perform at least one action to mitigate the suspected cyber-attack. For example, attack hunter module 120 may produce at least one notification 30 such as a warning message, and/or a command to one or more network components (e.g., switches, routers, gateways, etc.) in network 70, to block or mitigate the underlying cyber-attack, as elaborated herein.

In other words, attack hunter 120 may be adapted to identify, and catch suspected sequences that represent traversal over simulated attack vectors, either between computing devices and/or within specific computing devices. The attack vectors are "simulated" in a sense that they are produced automatically, to imitate or mimic real-world events, where known (e.g., scanned) vulnerabilities of protected network 70 are exploited. Upon identification of occurrence of an attack vector (e.g., when rule 130A is "triggered"), attack hunter 120 may perform the one or more mitigation actions associated with rule 130A. For example, attack hunter 120 may produce at least on notation or command 30, to mitigate or block the cyber-attack, as elaborated herein.

Additionally, or alternatively, attack hunter 120 may perform the one or more mitigation actions associated with rule 130A, in relation to, or upon specific entities (e.g., servers, workstations, web-pages, databases, etc.), which are associated with the one or more monitored sequence data structures 125A.

Figure 9:
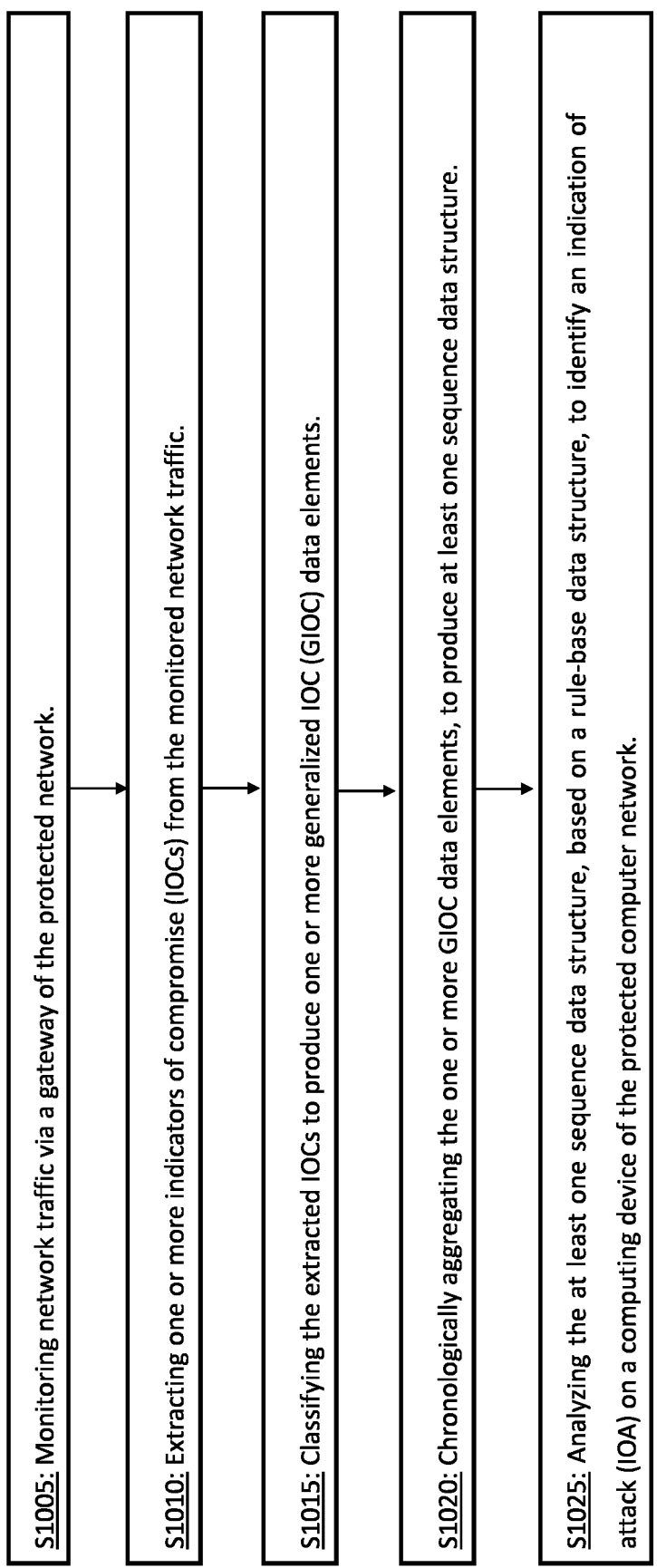
FIG. 9 is a flow diagram, depicting a method for identifying cyber-attacks on a computing device of a protected computer network, by at least one processor, according to some embodiments.

Reference is now made to FIG. 9, which is a flow diagram, depicting a method for identifying cyber-attacks on a computing device of a protected computer network, by at least one processor (e.g., element 1 of FIG. 1), according to some embodiments.

As shown in step S1005, the at least one processor may monitor network traffic via a gateway (e.g., gateway 110 of FIG. 6) of the protected network (e.g., protected network 70 of FIG. 6).

As shown in step S1010, the at least one processor may collaborate with an IOC extraction module (e.g., element 115 of FIG. 6), to extract one or more indicators of compromise (e.g., IOCs 115A of FIG. 6) from the monitored network traffic 20.

As shown in step S1015, the at least one processor may collaborate with a GIOC extraction module to classify or generalize the extracted IOCs, so as to produce one or more GIOC data elements 123A, as elaborated herein (e.g., in relation to FIG. 3).

As shown in step S1020, the at least one processor may collaborate with a sequence extraction module (e.g., element 125 of FIG. 6), to chronologically aggregate the one or more GIOC data elements, to produce therefrom at least one sequence data structure 125A as elaborated herein (e.g., in relation to FIG. 2 and/or FIG. 4).

As shown in step S1025, the at least one processor may analyze the at least one sequence data structure 125, based on a rule-base data structure (e.g., element 130A of FIG. 2 and/or FIG. 6), to identify an indication of attack (IOA) on a computing device 77 of the protected computer network 70.

Embodiments of the invention may include a practical application for identifying, and optionally preventing cyber-attacks against a protected computer network.

Embodiments of the invention may include an improvement in computer network and data security, in relation to currently available systems and methods for detection and prevention of cyber-attacks.

For example, by generalizing incoming indications of compromise in the form of GIOC data elements 123A as elaborated herein, embodiments of the invention may facilitate automatic learning of sequences of GIOCs 123A that pertain to cyber-attacks with high probability. The automatic learning of suspected GIOC-based sequences may in turn greatly improve the outcome of network traffic analysis. For example, network traffic analysis based on sequences of GIOCs may substantially reduce the portion of false-positive cyber-attack indications, in relation to currently available cyber-security systems that do not employ IOC generalization.

Unless explicitly stated, the method embodiments described herein are not constrained to a particular order or sequence. Furthermore, all formulas described herein are intended as examples only and other or different formulas may be used. Additionally, some of the described method embodiments or elements thereof may occur or be performed at the same point in time.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

The invention claimed is:

1. A method of identifying, by at least one processor, cyber-attacks on a computing device of a protected computer network, the method comprising:

scanning one or more entities of the protected computer network, to obtain one or more organizational vulnerabilities;

producing a simulated sequence of indicators of compromise (IOCs) that simulate traversal of an attack vector, based on the organizational vulnerabilities;

generalizing the IOCs of the simulated sequence, so as to produce a sequence of simulated, generalized IOC (GIOC) data elements;

producing at least one rule, based on the sequence of simulated GIOCs, wherein said rule is associated with a definition of one or more mitigation actions;

monitoring network traffic via a gateway of the protected network;

extracting one or more IOCs from the monitored network traffic;

classifying the extracted IOCs to produce one or more extracted GIOC data elements;

chronologically aggregating the one or more extracted GIOC data elements, to produce at least one sequence data structure;

analyzing the at least one sequence data structure, based on the at least one rule, to identify an indication of attack (IOA) on a computing device of the protected computer network; and based on said analysis, performing the one or more mitigation actions associated with the at least one rule.

2. The method of claim 1, further comprising producing at least one alert notification, indicating a likelihood that one or more specific sequence data structures are associated with an IOA against a computing device of the protected network.

3. The method of claim 1, wherein the at least one sequence data structure comprises a chronologic aggregation of one or more extracted GIOC data elements that pertain to one or more specific network entities of the protected network, and wherein the at least one sequence data structure corresponds to a time window of a predefined length.

4. The method of claim 1 further comprising:
introducing at least one sequence data structure as input to a machine learning (ML) based classification model, trained to predict a likelihood of the at least one sequence data structure to be associated with a cyber-attack;

determining at least one rule, associating the at least one sequence data structure to an IOA, based on the predicted likelihood;

aggregating the at least one determined rule to obtain a rule-base data structure; and analyzing the at least one sequence data structure, based on the rule-base data structure, to identify the IOA on the computing device of the protected computer network.

5. The method of claim 4, comprising:
chronologically aggregating a first plurality of sequence data structures corresponding to a first timeslot;

obtaining at least one annotation data element, indicating a cyber-attack that has suspectedly occurred during the first timeslot; and training the classification model to predict the likelihood of at least one sequence data structure to be associated with an IOA, based on the sequence data structures of the first timeslot, and the at least one annotation data element.

6. The method of claim 5, comprising:
chronologically aggregating a second plurality of sequence data structures corresponding to a second timeslot; and training the classification model to predict the likelihood of at least one sequence data structure to be associated with an IOA, further based on the sequence data structures of the second timeslot.

7. The method of claim 6, wherein the first timeslot corresponds to a period that includes the suspected cyber-attack, and wherein the second timeslot corresponds to a period that predates the suspected cyber-attack.

8. The method of claim 4, wherein the ML-based classification model comprises a random forest decision tree model, wherein each node of the random forest decision tree model represents a sequence data structure.

9. The method of claim 4, wherein the at least one rule comprises two or more sequence data structures, and wherein said two or more sequence data structures are associated by at least one of: a common timeframe, a Boolean logic function, and an attribute of order.

10. The method of claim 1, further comprising:
calculating a likelihood value of at least one simulated GIOC sequence, representing a likelihood of the relevant simulated GIOC sequence to be included in a cyber-attack; and producing the at least one rule further based on the likelihood value.

11. A system for identifying cyber-attacks on a computing device of a protected network, the system comprising: a non-transitory memory device, wherein modules of instruction code are stored, and at least one processor associated with the memory device, and configured to execute the modules of instruction code, whereupon execution of said modules of instruction code, the at least one processor is configured to:

scan one or more entities of the protected computer network, to obtain one or more organizational vulnerabilities;

produce a simulated sequence of indicators of compromise (IOCs) that simulate traversal of an attack vector, based on the organizational vulnerabilities;

generalize the IOCs of the simulated sequence, so as to produce a sequence of simulated, generalized IOC (GIOC) data elements;

produce at least one rule, based on the sequence of simulated GIOCs, wherein said rule is associated with a definition of one or more mitigation actions;

monitor network traffic via a gateway of the protected network;

extract one or more IOCs from the monitored network traffic;

classify the extracted IOCs to produce one or more extracted GIOC data elements;

chronologically aggregate the one or more extracted GIOC data elements, to produce at least one sequence data structure;

analyze the at least one sequence data structure, based on the at least one rule, to identify an IOA on a computing device of the protected computer network; and based on said analysis, performing the one or more mitigation actions associated with the at least one rule.

12. The system of claim 11, wherein the at least one processor is further configured to produce at least one alert notification, indicating a likelihood that one or more specific sequence data structures are associated with an IOA against a computing device of the protected network.

13. The system of claim 11, wherein the at least one sequence data structure comprises a chronologic aggregation of one or more extracted GIOC data elements that pertain to one or more specific network entities of the protected network, and wherein the at least one sequence data structure corresponds to a time window of a predefined length.

14. The system of claim 11, wherein the at least one processor is further configured to:
introduce at least one sequence data structure as input to a machine learning (ML) based classification model, trained to predict a likelihood of the at least one sequence data structure to be associated with a cyber-attack;
determine at least one rule, associating the at least one sequence data structure to an IOA, based on the predicted likelihood; and
aggregate the at least one determined rule to obtain a rule-base data structure; and
analyze the at least one sequence data structure, based on the rule-base data structure, to identify the IOA on the computing device of the protected computer network.

15. The system of claim 14, wherein the at least one processor is further configured to:
chronologically aggregate a first plurality of sequence data structures corresponding to a first timeslot;
obtain at least one annotation data element, indicating a cyber-attack that has suspectedly occurred during the first timeslot; and
train the classification model to predict the likelihood of at least one sequence data structure to be associated with an IOA, based on the sequence data structures of the first timeslot, and the at least one annotation data element.

16. The system of claim 15, wherein the at least one processor is further configured to:
chronologically aggregate a second plurality of sequence data structures corresponding to a second timeslot; and
train the classification model to predict the likelihood of at least one sequence data structure to be associated with an IOA, further based on the sequence data structures of the second timeslot.

17. The system of claim 16, wherein the first timeslot corresponds to a period that includes the suspected cyber-attack, and wherein the second timeslot corresponds to a period that predates the suspected cyber-attack.

18. The system of claim 14, wherein the ML-based classification model comprises a random forest decision tree model, wherein each node of the random forest decision tree model represents a sequence data structure.

19. The system of claim 14, wherein the at least one rule comprises two or more sequence data structures, and wherein said two or more sequence data structures are associated by at least one of: a common timeframe, a Boolean logic function, and an attribute of order.

* * * * *